Patented Feb. 20, 1934

1,948,461

UNITED STATES PATENT OFFICE 1,948,461

PRODUCTION OF OPAQUE GLASSES AND ENAMELS

Ignaz Kreidl, Vienna, Austria

No Drawing. Application July 10, 1930, Serial No. 467,138, and in Austria August 8, 1929

9 Claims. (Cl. 106—36.2)

The subject of the invention is a process for the production of opaque glazes and enamels. The usual opaquing agents employed for producing opacity in the enamel industry are compounds, such as tin oxide, zirconium oxide or the like, which act by reason of their own color and by mechanical distribution in the enamel mixture. It has already been proposed in applicant's earlier copending applications to produce opacity by the formation in the enamel mixture during the firing or burning of the enamel, of finely divided gas bubbles liberated by decomposable substances added for this purpose.

In the employment of such gas-liberating agents for the production of opacity, it has been found that not all substances which liberate gases or decompose at the firing or burning temperature produce suitable opacity, or form effective substitutes for the ordinary white clouding agents, such as tin oxide, zirconium oxide and the like.

The present invention is based on the discovery that the only substances which are suitable for producing opacity by the liberation of gas are those that are decomposable or volatile at or below the firing or burning temperature of the enamel and which are so powerfully adsorbed by some constituent of the enamel mixture or enamel frit, or by some specially added substance (for example a substance added on the mill) that they are retained by the enamel up to the time of firing. It has moreover, been discovered in this connection that not all adsorbable substances lead to equally good results, and that the opacity produced by gas varies according to the adsorption capacity of the enamel mixture, and to the grain size of the adsorbent, such as clay or the like, in relation to the various substances. Poor results are caused by the formation of excessively large bubbles, and also by discoloring or changing of the color, evidently due to incomplete decomposition with formation of discoloring intermediate products.

The invention is based, on the one hand, on the observation that the suitability of a substance for producing opacity by the liberation of gas increases with the ease with which it can be adsorbed, and on the other hand, on the observation that the opacity is also dependent on the interior surface of the adsorbent, that is to say, on the grain-size of the latter.

The more a substance is capable of being adsorbed, the smaller the amount needed to produce opacity in an enamel, since only the adsorbed amount comes substantially into operation, so that sufficiency is obtained with a minimum amount of the agent. Such substances, which are readily adsorbable and being needed in minimum amount, are the least expensive, have the further advantage of preventing marginal boiling or bubbling, the cause of which appears to be local accumulation of the agent producing opacity at the margin, or an increased adsorption of said agent resulting at the margin, a condition which can be prevented, according to the invention, by reducing the amount of the agent producing opacity. Hence, the most suitable agents for this purpose are those which produce opacity by the use of such small amounts that the formation of optically discernible bubbles at the grain boundaries is avoided.

The modification of the internal surface of the adsorbent, that is, the grain size, may be effected by grinding, and also by the addition of peptizing agents, coagulents or the like such as acids, or salts of same, especially mineral acids or their salts, metallic acids or their salts, such as tungstic acid, tungstates, and the like.

Peptizing agents, coagulents or the like, are known per se; they are selected depending on the adsorbent in accordance with the laws of colloidal chemistry, the amount and concentration, that is to say, the adjustment of the adsorbent to a pre-determined grain size, being easily ascertained by simple experiments.

From these observations, it follows that, in order to obtain the correct opacity, and to prevent large bubble formation, dulling and discoloration of the enamel due to incomplete decomposition of the agent producing the opacity, a certain quantity of gas—differing for each enamel mixture—in the form of bubbles of a definite order of dimensions, must be present. This amount can be determined empirically for each decomposable substance—i. e. substance which is decomposable or volatile, in the adsorbed condition, at firing or burning temperature—by varying:

(a) the agent producing capacity, (b) the amount of such agent, (c) the adsorbent, (d) the amount of this latter, and (e) the internal surface or grain size of same.

Effective adsorbents comprise, for example, clay or kaolin, substances, especially colloids, which do not, of themselves, produce opacity, and also substances which although they can produce opacity, are employed in insufficient amount to produce opacity by themselves.

In carrying out the process according to the present invention, the substances intended to be adsorbed may be employed per se, or already adsorbed by the adsorbent. This latter measure is necessary when—as in the case of the dry-process enameling—no opportunity is afforded for the adsorption during the enamelling process.

The employment of the agent producing opacity in a ready-adsorbed condition on the adsorbent—, if necessary peptized, coagulated or the like—has also the advantage of rendering the adsorption process independent of the enamelling process. Thus, for example, extremely fine grinding of the adsorbent with the adsorptive material increases the adsorption. There would, however, be no advantage in obtaining this effect by this means in the mill, since, as is known, extremely fine grinding in the mill injures the enamel.

If highly adsorbable opaquing agents be selected—in association with the peptization agents, coagulents or the like, if desired—even as little as about 0.01% of the opaquing agent may prove sufficient, and, given suitable selection of the peptization agent, coagulent or the like, additions of even less than 0.1% of these are enough.

Substances suitable for producing opacity comprise both organic and inorganic substances and also mixed organic-inorganic substances. Among organic substances, mention may be made of organic dye-stuffs, organic compounds of high molecular weight, fatty acids and their salts, aromatic carboxylic acids and their salts, naphtols and the like.

The number of the organic substances suitable for producing opacity which are adsorbed by the enamel mixture or by a constituent of the enamel mixture, such as clay, is one very great one. It needs only a simple experiment.

Among inorganic substances, may be mentioned nitrates according to their adsorptive capacity, these being subject to the provision that, in the adsorbed condition, they do not undergo decomposition until the enamel is fired.

Opacity agents which are insoluble in water, or are incapable of being adsorbed, can be rendered suitable for the process according to the invention by dissolving them in a solvent, and thus rendering them adsorptive.

The process of the present invention is applicable both to the usual enamel mixtures, which are preliminarily clouded with fluorides, such as cryolite, and to enamel mixtures which are low in, or free from, fluorides, and also to enamel mixtures containing fluorine such as have lost their preliminary opacity, for example by over calcining.

Example 1

| | Grams |
|---|---|
| Frit | 1000 |
| Water | 500 |
| Methylene blue | 0.1 |
| Sodium chloride | 0.5 |
| Clay | 100 |

Example 2

| | |
|---|---|
| Frit | 1000 |
| Water | 500 |
| γ-naphthol | 0.5 |
| Sodium perchlorate | 0.3 |
| Clay | 60 |

Example 3

| | |
|---|---|
| Frit | 1000 |
| Water | 500 |
| Thiazol yellow | 0.25 |
| Borax | 5 |
| Potassium perchlorate | 2 |
| Vallendar clay | 60 |

What I claim is:

1. An improved process of producing white clouded enamels for ironware and the like, which consists in adding to the enamel frit while grinding the same in the presence of water, in lieu of the known white insoluble oxides heretofore used as the clouding media, substances which per se, in unchanged condition are incapable of serving as clouding agents, but which, upon the burning of the enamel, evolve gases which remain in the enamel at the firing thereof, together with a clay which is capable of adsorbing strongly said gas-evolving substances, and controlling the size, number and sub-division of the gas bubbles evolved in the enamel on firing by altering, prior to firing, the amount of the clay used.

2. The process as set forth in claim 1, in which the size of the gas bubbles evolved in the enamel on firing is reduced by increasing, prior to firing, the amount of clay used.

3. The process as set forth in claim 1, in which the size of the gas bubbles evolved in the enamel on firing is reduced by reducing, prior to firing, the grain size of the clay by adding thereto a peptizing agent.

4. The process as set forth in claim 1, in which the size of the gas bubbles evolved in the enamel on firing is reduced by reducing, prior to firing, the grain size of the clay by adding thereto a peptizing agent in amounts not in excess of 0.1% of the enamel frit.

5. An improved process of producing white clouded enamels which comprises adding to the enamel frit as a clouding medium a heat decomposable substance adapted to evolve gas at the usual firing temperature of the enamel, said heat decomposable substance being such as will be adsorbed by a constituent of the enamel and will remain adsorbed until the firing of the enamel and being selected from the class consisting of organic compounds having high molecular weights selected from the group comprising dye-stuffs and dyestuff intermediates, fatty acids and their salts, aromatic carboxylic acids and their salts, naphthols and the like.

6. The process as set forth in claim 5 in which the clouding medium adsorbant substance is clay.

7. The process set forth in claim 5 in which the opacity of the enamel is influenced by modifying the grain size of the adsorbant substance.

8. The process as set forth in claim 5 wherein the adsorbtive capacity of the clouding medium is influenced by the addition of special substances selected from the classes of substances known as peptizing agents and coagulating agents.

9. The process as set forth in claim 5, in which the clouding medium is methylene blue.

IGNAZ KREIDL.

CERTIFICATE OF CORRECTION.

Patent No. 1,948,461. February 20, 1934.

IGNAZ KREIDL.

It is hereby certified that error appears in the printed specification of the above numbered patent requiring correction as follows: Page 2, line 35, strike out the word "one" both occurrences; and that the said Letters Patent should be read with this correction therein that the same may conform to the record of the case in the Patent Office.

Signed and sealed this 3rd day of April, A. D. 1934.

F. M. Hopkins (Seal) Acting Commissioner of Patents.